United States Patent [19]

Cooper

[11] Patent Number: 5,163,870
[45] Date of Patent: Nov. 17, 1992

[54] PROTECTIVE DUST COVER FOR COMPUTER COMPONENTS

[75] Inventor: Dean C. Cooper, Sylvania, Ohio

[73] Assignee: Systems Alternatives, Inc., Toledo, Ohio

[21] Appl. No.: 762,243

[22] Filed: Sep. 18, 1991

Related U.S. Application Data

[63] Continuation of Ser. No. 606,047, Oct. 30, 1990, abandoned.

[51] Int. Cl.⁵ .......................... F24F 7/00; F24F 13/20
[52] U.S. Cl. ........................... 454/184; 55/385.6; 55/467; 361/384
[58] Field of Search .................. 98/1, 115.3; 55/385.6, 55/467; 312/31.1, 31.2, 138.1; 361/384

[56] References Cited

U.S. PATENT DOCUMENTS

| | | |
|---|---|---|
| D. 190,146 | 4/1961 | Reed et al. |
| D. 237,755 | 11/1975 | Ray, Jr. |
| D. 265,561 | 7/1982 | Cottrell |
| D. 268,283 | 3/1983 | Hicks |
| 2,735,964 | 2/1956 | Grieve et al. .................. 55/385.6 X |
| 3,267,830 | 8/1966 | Gaasbeek ......................... 98/1 |
| 4,059,903 | 11/1977 | Piet et al. ........................ 98/115.3 X |
| 4,414,576 | 11/1983 | Randmae ......................... 361/384 X |
| 4,449,763 | 5/1984 | Barnett .............................. 312/208 |
| 4,626,048 | 12/1986 | Goodlander ....................... 312/208 |
| 4,709,972 | 12/1987 | Labudde et al. .................. 312/208 |
| 4,749,241 | 6/1988 | Thoresen et al. ................. 312/31.2 X |
| 4,751,872 | 6/1988 | Lawson, Jr. ....................... 98/1 |
| 4,889,542 | 12/1989 | Hayes ................................ 55/471 X |
| 5,021,763 | 6/1991 | Obear ................................ 361/381 X |

OTHER PUBLICATIONS

Quill Office Products Catalog, copyright 1990 Quill Corporation, Nov. 1990 through Apr. 1991, p. 160.
The Franklin Office Products Co. Catalog, copyright USS May 1989, Section E2, pp. 403, 404 & 405.
Office Mart 1991 Office Supplies Catalog, copyright BCOP Dec. 1990, Section E4, pp. M49-M50.

*Primary Examiner*—Harold Joyce
*Attorney, Agent, or Firm*—MacMillan, Sobanski & Todd

[57] ABSTRACT

A dust cover for protecting a computer component includes an open bottom enclosure which completely covers the computer component and includes a lower edge having a compressible seal member which engages the resting surface on which the component is situated. The cover can be constructed from a clear acrylic material and can be provided with a notched opening in a rear wall for running electrical power supply cords and related wires therethrough. To provide for sufficient cooling of the enclosed component, an exhaust fan is located in an opening formed in the rear wall of the cover and draws cooling air through a separate replaceable filter element located in an inlet opening provided in the cover. If it is necessary to have access to the component such as the disk drive unit, a sliding access door can be provided at the appropriate location. In the preferred embodiment, two covers are used to form an assembly, with the lower cover provided to enclose a central processing unit housing (CPU), and an upper cover provided for enclosing a computer monitor.

19 Claims, 1 Drawing Sheet

U.S. Patent        Nov. 17, 1992        5,163,870
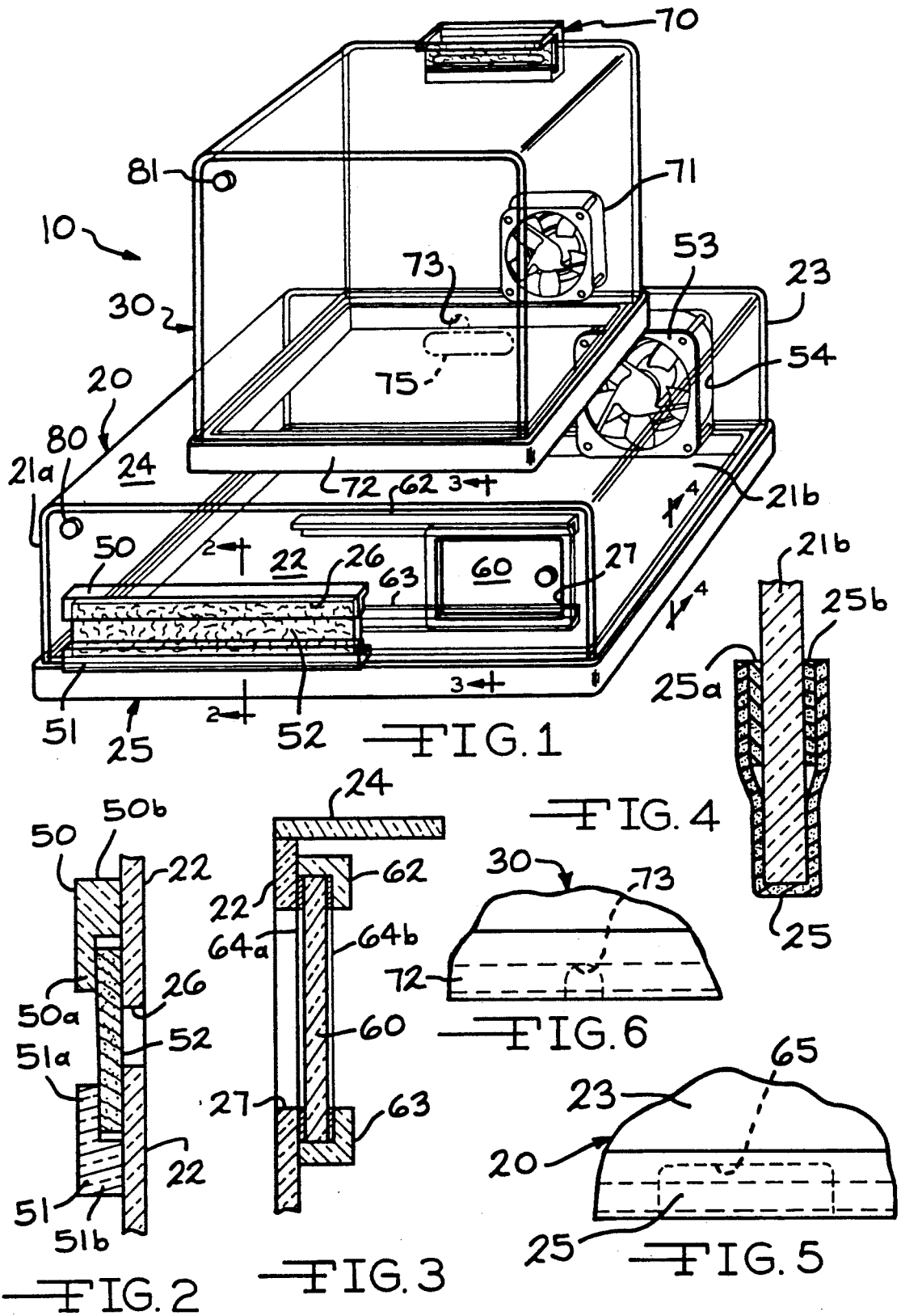

PROTECTIVE DUST COVER FOR COMPUTER COMPONENTS

This is a continuation of application Ser. No. 606,047 filed Oct. 30, 1990 abandoned.

BACKGROUND OF THE INVENTION

This invention relates in general to a cover for protecting electronic components such as, for example, computers.

Computers, especially smaller computers which have become known as "PC's", have become commonplace in many homes and most businesses. While the typical office or home usually presents a relatively clean operating environment for a computer, in other environments such as a machine shop, factory, or similar working place, the computer can be subjected to a relatively dusty or dirty environment. Prolonged direct exposure to such environments can adversely affect the operating conditions of the computer.

It is well known that the keyboard of a computer may be protected in adverse working situations by placing a clear, flexible plastic cover over the board specifically designed to still allow use thereof. Such a cover is readily available and can be seen in many workplaces such as, for example, automotive service stations.

Enclosures are also known and readily available for reducing the operating noise level of a computer printer. For example, U.S. Pat. No. 4,626,048 to Goodlander discloses a printer housing for sound proofing the noise output of this printer. The housing in this patent includes a muffin fan to provide cooling airflow through the sound proofing housing.

SUMMARY OF THE INVENTION

The present invention is specifically concerned with a dust cover which is adapted to protect certain computer components such as a central processing unit housing (CPU) or a computer monitor. In the past, these components have typically been left at least partially unprotected when in use in harsh operating environments.

Generally, the dust cover of this invention includes an open bottom enclosure which covers the computer component, and is provided with a compressible seal member around its lower edge which engages the resting surface on which the component is situated. The cover can be constructed from a plastic sheet material such as clear acrylic, and can be provided with a notched opening in the rear wall for running the electrical power supply cord and related wires therethrough. To provide for sufficient cooling of the enclosed component, an exhaust fan is located in an opening formed in the rear wall of the cover, and draws cooling air through a separate replaceable filter element located in an inlet opening provided in the cover. If it necessary to have access to the computer component such as access to a disk drive unit, an opening can be provided in the cover at this location, and a sliding access door can be mounted to close the opening.

In the preferred embodiment of the invention, two covers are used to form an assembly, with a lower cover provided to enclose a CPU housing, and an upper cover provided for enclosing a computer monitor. If the computer monitor is to be situated on top of the CPU, the lower cover will enclose the CPU and sealingly engage the resting surface on which the CPU is sitting, while the computer monitor will rest on the top wall of the lower cover which will be sealingly engaged by the lower edge of the upper cover.

In an alternate embodiment of the invention, in instances wherein the computer monitor is to be situated on top of the CPU housing, the filtered inlet opening of the lower cover can be eliminated, while the exhaust fan of the upper cover can be eliminated, and a separate opening can be provided in the top wall of the lower cover to enable cooling air to be initially pulled through the upper cover and then through the lower cover.

Other advantages of this invention will become apparent to those skilled in the art from reading the following detailed description of the preferred embodiment of the invention, in light of the accompanying drawings.

BRIEF DESCRIPTION OF THE DRAWINGS

FIG. 1 is a perspective view of a protective dust cover assembly constructed in accordance with the present invention;

FIG. 2 is an enlarged sectional view taken along the line 2—2 of FIG. 1 and showing the replaceable filter element;

FIG. 3 is an enlarged sectional view taken along the line 3—3 of FIG. 1 and showing the sliding access door;

FIG. 4 is an enlarged sectional view taken along the line 4—4 of FIG. 1 and showing the compressible seal member located along the lower edge of the cover;

FIG. 5 is an enlarged fragmentary rear plan view showing a notch which is formed in the lower edge of the rear wall of the lower covered, and is normally cover by the compressible seal member; and FIG. 6 is a fragmentary rear plan view showing a notch formed in the lower edge of the rear wall of the upper cover.

DETAILED DESCRIPTION OF THE PREFERRED EMBODIMENT

Referring now to the drawings, there is illustrated in FIG. 1 a protective dust cover assembly, indicated generally at 10, and which includes a separate lower protective cover 20 and a separate upper protective cover 30, each constructed in accordance with the present invention. The lower cover 20 is adapted to be placed over a central processing unit housing (CPU) (not shown) while the upper cover 30 is adapted to enclose a computer monitor (not shown). In FIG. 1, the upper cover 30 is situated to enclose a computer monitor which rests on top of the lower cover 20. However, in some instances, it may be desirous to separate the upper and lower covers from one another. In either situation, both of the covers, in conjunction with the associated resting surfaces, completely surround the respective computer components to effectively isolate the components from the outside environment. While the covers 20 and 30 are preferably formed from a plastic sheet material, such as clear acrylic, other sheet materials may be substituted therefore.

Turning now to the specific construction of the individual covers, the lower or (CPU) cover 20 will be discussed first. The lower cover 20 is formed in the shape of an open bottom generally rectangular container having spaced apart side walls 21a and 21b, a front wall 22, a rear wall 23, and a top wall 24. The walls 21a, 21b, 22, 23, and 24 of the lower cover 20 may be joined together by any appropriate method, such as gluing or heat sealing, to form the open bottom lower cover as shown. In the embodiment shown in FIG. 1, the top wall 24 and the two side walls 21a and 21b are formed from a single sheet of material which is bent into an inverted U-shaped configuration.

In accordance with one feature of the present invention, a compressible seal member or gasket 25, shown in section in FIG. 4, is mounted around the entire lower edge of the cover 20, and is adapted to sealingly engage the resting surface on which the associated computer component is situated. While various types of seal members can be used, it has been found that a rubber seal member having a generally U-shaped cross-section, and which can be easily slipped over the lower edge of the cover and secured with two-side adhesive tape (shown at 25a and 25b), provides satisfactory results.

A generally rectangular opening 26 is provided in the lower left side of the front wall 22 of the lower cover 20. The opening 26 provides an inlet for air to enter into the cover 20 and cool the CPU housed within. As best shown in FIG. 2, a pair of L-shaped channels 50 and 51 are positioned above and below the opening, and have legs 50a and 51a facing one another to form a track therebetween. The L-shaped channels 50 and 51 are secured along the other legs 50b and 51b to the exterior surface of the front wall 22 by an appropriate method, such as gluing or heat sealing. The track formed by the channels 50 and 51 is adapted to slidingly receive a replaceable filter 52 which completely covers the opening 26. The filter 52 insures that the cooling air entering the cover 20 is substantially free from dust and other particulates.

An exhaust fan 53 is mounted in an opening 54 provided in the rear wall 23 of the lower cover 20. The exhaust fan 53 may be securely mounted in the opening 54 by an appropriate means and is operative to pull air through the filter inlet opening 26 and circulate the air around the CPU.

The CPU cover 20 also includes a generally rectangular opening 27 along the right side of the front wall 22. The opening 27 provides access to enable diskettes to be inserted or removed from a disk drive of the CPU once the cover 20 is placed thereover. In order to close the opening 27, an access door member 60 is slidably mounted along the back surface of the front wall 22 within upper and lower tracks 62 and 63, as shown in FIG. 3. Separate front and rear sealing strips 64a and 64b are secured to the front and rear surfaces of the door around its entire perimeter. The strips 64a and 64b enable the door to slide smoothly within the associated tracks, while the front strip 64a sealing engages the back surface of the front wall 22 when the door is in the closed position.

As shown in FIG. 5, a notched opening 65 is provided in the lower edge of the rear wall 23 of the lower cover 20 and is normally covered by the bottom gasket 25. The opening 65 provides a passageway for power cords and other electrical connecting cords to pass through. It will be appreciated that the gasket 25 is compressible in this region to effectively seal the opening around the electrical cords.

The upper cover 30 is similar to the lower cover 20, except that the upper cover does not include the diskette access door. Also, the upper cover is of a slightly different rectangular configuration to accommodate the computer monitor, and has a filter assembly 70 located at the upper end of the rear wall, such that the front wall of the cover is substantially unobstructed to provide a clear view of the computer monitor. As shown in FIG. 1, in addition to the replaceable filter assembly 70, an exhaust fan 71 is mounted on the rear wall of the upper cover, while a compressible gasket 72 surrounds the entire lower edge of the upper cover, including a notched opening 73 provided in the rear wall, as shown in FIG. 6.

It should be noted that the description of the preferred embodiment describes the invention as an assembly which includes a separate cover for covering the CPU housing and the computer monitor. However, in its broadest application, the present invention is directed to a single open bottom cover which, in conjunction with an associated resting surface, functions to effectively isolate an electronic component housed therein from dust and dirt from the associated environment.

Alternate embodiments of the invention have been contemplated. In particular, the computer monitor can be situated directly on top of the CPU housing, and a single cover can be used to simultaneously protect both components. Also, in instances wherein the upper cover is to be situated on top of the lower cover, the exhaust fan of one of the two covers can be eliminated, and the filtered coolant opening of the other cover can be eliminated, while an opening such as the opening shown in phantom in FIG. 1 at 75 can be located in the top wall of the lower cover within the perimeter of the upper cover. Thus, in these instances, if the filter in the lower cover and the fan in the upper cover were eliminated, cooling air would be pulled through the filtered inlet of the upper cover, down through the opening 75 in the top wall of the lower cover, and out the exhaust outlet of the lower cover. Additionally, an optional feature can include an automatic temperature warning system, schematically represented at 80 and 81 which would inform the user in the event that the temperature within the covers had exceeded a predetermined amount.

The present invention has been illustrated and described in what is considered to represent its preferred embodiment. However, as noted above, the invention can include modifications without departing from the scope of the attached claims.

What is claimed is:

1. A protective cover for an electronic component positioned on a resting surface comprising:

a housing defining an open bottom enclosure, said housing adapted to be positioned over the electronic component to completely cover the component, said housing constructed of air impermeable top and side panels, said side panels including a lower edge surrounding the entire periphery of said housing for supporting said housing on the resting surface;

at least one inlet opening provided in one of said panels of said housing, said inlet opening providing substantially the only means through which cooling air is able to enter said housing;

filter means located in said inlet opening for filtering substantially all of the cooling air entering said housing through said inlet opening;

an outlet opening provided in one of said panels of said housing;

fan means carried by said housing for drawing the cooling air into said housing through said inlet opening and exhausting the cooling air from said housing through said outlet opening to provide flow through ventilation and cooling of the electronic component covered by said housing; and means for sealing between said housing and the resting surface to define a protected operating environment for the associated electronic component which requires substantially all of the cooling air which enters said housing to pass through said inlet opening and be filtered by said filter means during operation of said fan means.

2. The invention defined in claim 1 wherein said housing includes a clear front wall, said clear front wall allowing the electronic component to be viewed when covered by said housing.

3. The invention defined in claim 1 wherein said housing further, includes an access opening, said access opening provided with a door member, said door member being movable between a first position, wherein said access opening is closed, and a second position, wherein said access opening is opened, thereby allowing access to a portion of the electronic component when the component is covered by said housing.

4. The invention defined in claim 1 and further including a temperature warning means, said temperature warning means adapted to indicate a condition that the temperature of the air within said housing has exceeded a predetermined value.

5. The invention defined in claim 1 wherein said housing includes a notched opening along said lower edge to allow electrical power lines to pass therethrough.

6. The invention in claim 1 wherein said housing includes a pair of spaced side walls, a front wall spaced from a rear wall, and a top member interconnecting the top edges of said side, front and rear walls together to form said open bottom enclosure.

7. The invention defined in claim 1 wherein said fan means is located in said outlet opening.

8. The invention defined in claim 1 wherein said means for sealing is a separate seal member provided on said lower edge of said housing for engaging and supporting said housing on the resting surface.

9. The invention defined in claim 8 wherein said seal member is generally U-shaped.

10. The invention defined in claim 8 wherein said seal member substantially surrounds the entire periphery of said lower edge.

11. The invention defined in claim 10 wherein said seal member is rubber and forms a substantially air-tight seal between said housing and the resting surface.

12. The invention defined in claim 5 wherein said notched opening is provided with a means for forming a substantially air-tight seal between said housing and the electrical power lines passing therethrough.

13. A protective cover assembly for first and second electronic components wherein the first electronic component is positioned on a resting surface and the second electronic component is to be positioned above the first electronic component, the cover assembly comprising:
a first housing defining a first open bottom enclosure, said first open bottom enclosure including a top wall member for supporting the second electronic component, said first housing adapted to be placed over the first electronic component to completely cover the first component, said first housing including a lower edge surrounding the entire periphery of said first housing for supporting said first housing on the resting surface;
a second housing defining a second open bottom enclosure which is smaller than said first open bottom enclosure, said second housing adapted to be placed over the second electronic component to completely cover the second component, said second housing including a lower edge surrounding the entire periphery of said second housing for supporting said second housing on said top wall member of said first housing;
a first opening provided in one of said first and second housings;
filter means located in said first opening for filtering cooling air entering said one of said first and second housings through said first opening;
a second opening provided in said top wall member of said first housing, said second opening located within the periphery defined by said lower edge of said second housing;
a third opening provided in said other of said first and second housings; and
exhaust means provided adjacent said third opening for exhausting the cooling air from said one of said first and second housings, said exhaust means adapted to pull in cooling air through said first and second openings and exhaust the air out through said third opening to provide flow-through ventilation and cooling of the first and second electronic components.

14. The invention defined in claim 13 wherein said first opening is formed in said first housing and said third opening is formed in said second housing.

15. The invention defined in claim 13 wherein said first opening is formed in said second housing and said third opening is formed in said first housing.

16. The invention defined in claim 14 and further including a fourth opening provided in said first housing, a fifth opening provided in said second housing, an exhaust means provided adjacent said fourth opening for exhausting the cooling air from said first housing, and a filter means provided adjacent said fifth opening for filtering the cooling air entering said second housing through said fifth opening.

17. The invention defined in claim 13 and further including a notched opening along said lower edges of both said first and second housings, said notched opening adapted to allow electrical power wires to pass through said first and second housings.

18. The invention defined in claim 13 wherein said first housing includes an access opening, said access opening provided with a door member, said door member movable between a first position, wherein said access opening is closed, and a second position, wherein said access opening is opened, thereby allowing access to a portion of the first electronic component when said component is covered by said first housing.

19. The invention defined in claim 13 and further including a temperature warning means, said temperature warning means adapted to indicate a condition that the temperature of the air within said first and second housings has exceeded a predetermined value.

* * * * *